United States Patent [19]

Guyot et al.

[11] 4,160,384
[45] Jul. 10, 1979

[54] PROCESS FOR THE TURNING-IN OF A PART TO BE BALANCED AFFECTED BY IMBALANCE

[75] Inventors: Volker Guyot, Buettelborn; Otfrid Maus, Darmstadt; Martin Müller, Bickenbach, all of Fed. Rep. of Germany

[73] Assignee: Carl Schenck AG, Darmstadt, Fed. Rep. of Germany

[21] Appl. No.: 877,231

[22] Filed: Feb. 13, 1978

[30] Foreign Application Priority Data

Jun. 1, 1977 [DE] Fed. Rep. of Germany ....... 2724624

[51] Int. Cl.² ............................................. G01M 1/22
[52] U.S. Cl. .................................................... 73/462
[58] Field of Search .................. 73/462, 463, 464, 465

[56] References Cited

U.S. PATENT DOCUMENTS

| 3,835,712 | 9/1974 | Muller | 73/462 |
| 4,062,242 | 12/1977 | Brihier | 73/462 |

*Primary Examiner*—James J. Gill
*Attorney, Agent, or Firm*—Connolly and Hutz

[57] ABSTRACT

The balancing position of a wheel is designated by light signals which light up at closer intervals as the balancing position is approached in either turning-in direction. Such light signals upon approaching the balancing position include: a first signal in the range of approximately 180° to 90°, another light signal in the range from about 90° to 22.5°, a further light signal in the range of approximately 22.5° to 1.4°. Upon reaching the balancing position still a further light signal lights up between about 0° and 1.4°. A model representing the part to be balanced carries a series of light signals in both turning-in directions for each balancing plane provided by balancing apparatus.

7 Claims, 3 Drawing Figures

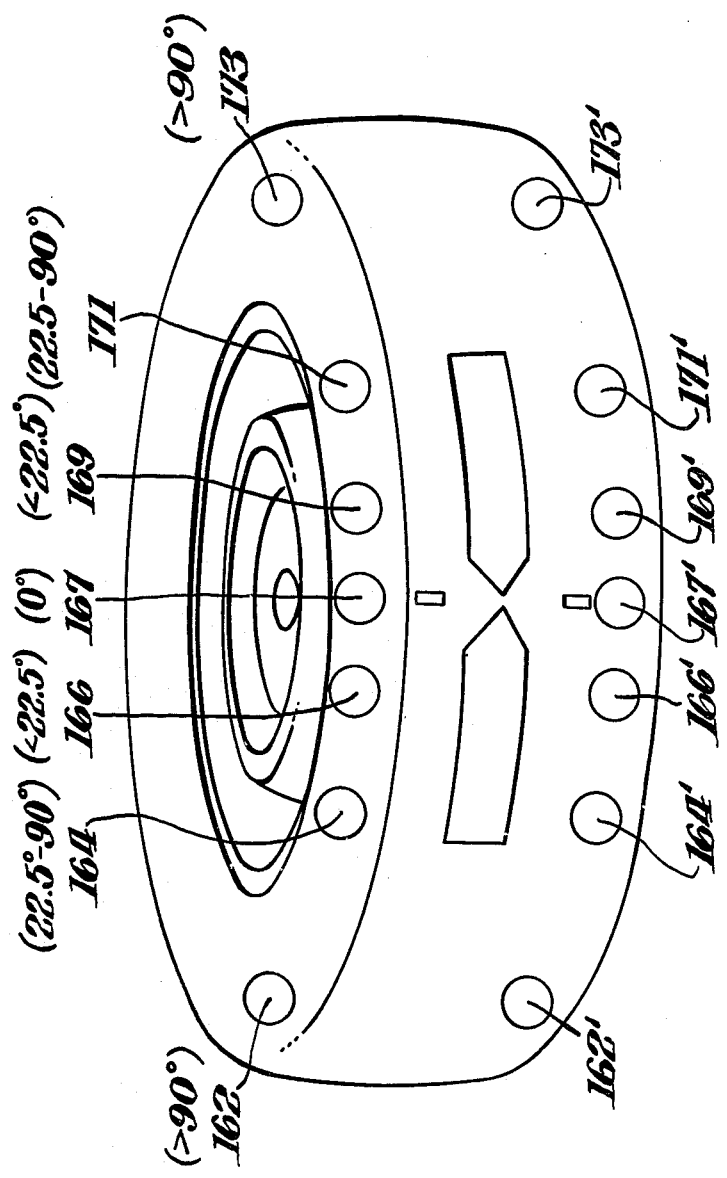

PROCESS FOR THE TURNING-IN OF A PART TO BE BALANCED AFFECTED BY IMBALANCE

BACKGROUND OF THE INVENTION

The invention relates to a process and a device for the rotational testing or turning-in of a part to be balanced affected by imbalance, particularly of a motor vehicle wheel, into a balancing position by a comparison of a particular angular orientation of the shaft with stored angle information and an indicator for the resultant adjustment.

From German DT-AS No. 16 48 336 a balancing device is known which emits information for the turning-in procedure only upon reaching the balancing point. Transmitting this information only upon reaching the balancing point has the drawback that the part to be balanced being turned-on cannot be easily brought to rest but rather only after a number of attempts, may be fixed in the correct balancing position.

From German DT-AS No. 22 13 449 a device for the angular indication of the imbalance in a balancing procedure has become known, which uses analogous structural parts and wherein the turning-in process is visualized by arrows for the direction, and additionally in a narrowly limited range of the turning-in procedure by means of a pointer moving together with the part to be balanced. The essential drawback consists, aside from the time-lag in the indication caused by the use of analogous structural units, in the fact that the evident representation of the balancing procedure occurs only in such a small range around the actual processing position that, as a result of the inert mass of the part to be balanced, several attempts are necessary to obtain the correct balancing position.

The prior art altogether generally has the drawback that the major portion of the turning-in procedure has to be performed "blindly" and thus necessarily leads to the above-mentioned further errors. Emanating from this prior art, the object of the present invention is to enable, in an apparent manner and in the quickest and shortest way, the turning-in of a part to be balanced, remaining standing in any position, with the avoidance of the above-mentioned drawbacks.

SUMMARY

This object is solved, according to the invention, in that upon turning-in according to a decreasing angle difference, several light signals light up in sequence in shorter and shorter phases of the difference angle between the immediate imbalance position and processing position. By means of the apparent feed-back signal of the immediate state of the part to be balanced to be turned-in in comparison with the attempted balancing position, it is necessarily required of the operator to reduce the rotational speed of the part to be balanced upon approaching the balancing position—so that upon reaching the balancing position, the part to be balanced can be stopped immediately without having to perform several approach attempts.

In a development of the invention, it is suggested that for both possible turning-in directions, a series of inertialess light signals lights up. Thus, with any position of the part to be balanced, at the beginning of the turning-in procedure, the shortest way to the balancing position is necessarily recommended.

A device for performing a novel process of this invention is a balancing machine having: vibration pickups, angle position transmitter, angle information storage means, and a comparison unit, whereby in the comparison unit, the immediate position of the angular position transmitter being compared with the stored angle information, and an indicating apparatus. Such balancing device is distinguished in that light signals arranged at distinct positions on the indicating apparatus are controlled by a certain number of comparison steps and that upon approaching the processing position, the number of controlling comparison steps decreases. An embodiment of this device is distinguished in that there are provided, per rotational balancing direction, a light signal for the range of between 180° and 90°, a further light signal for the range of between 90° and 22.5°, a further light signal for the range of between 22.5° and 1.4°, and that upon reaching the processing position, an additional light signal lights up, and in particular between 0° and 1.4°. Due to the decreasing light time of the diodes upon turning-in, the operator undertaking the rotational balancing is apparently alerted upon the approach of the balancing location, so that the braking procedure may be initiated in time and overshooting is avoided.

A particularly advantageous development of the invention subject matter for multiplane balancing is distinguished in that a figure representing the part to be balanced carries a series of light signals per rotational balancing direction, for each of the balancing planes. In yet a further development of the subject matter of the invention, it is suggested that the light signals be arranged geometrically in the center of the correlated range of the difference angle. By means of this representation of the part to be balanced, the further advantage is achieved in that the operator undertaking the rotational balancing will preferably grip an area of the part to be balanced, which is designated to him by the light signal and necessarily reduce the turning-in speed by movement of his hand when he comes close to the balancing location.

It is within the scope of the invention if the comparison to be made between the immediate position shown by the digital angle position transmitter and the stored angle information is electrically connected to a rotational balancing motor in order to position the part to be balanced into the balancing position automatically.

BRIEF DESCRIPTION OF THE DRAWINGS

In the drawing below, the subject matter of the invention is explained in greater detail by way of a schematic representation. There are shown in.

DESCRIPTION OF THE PREFERRED EMBODIMENTS

Figure 1:
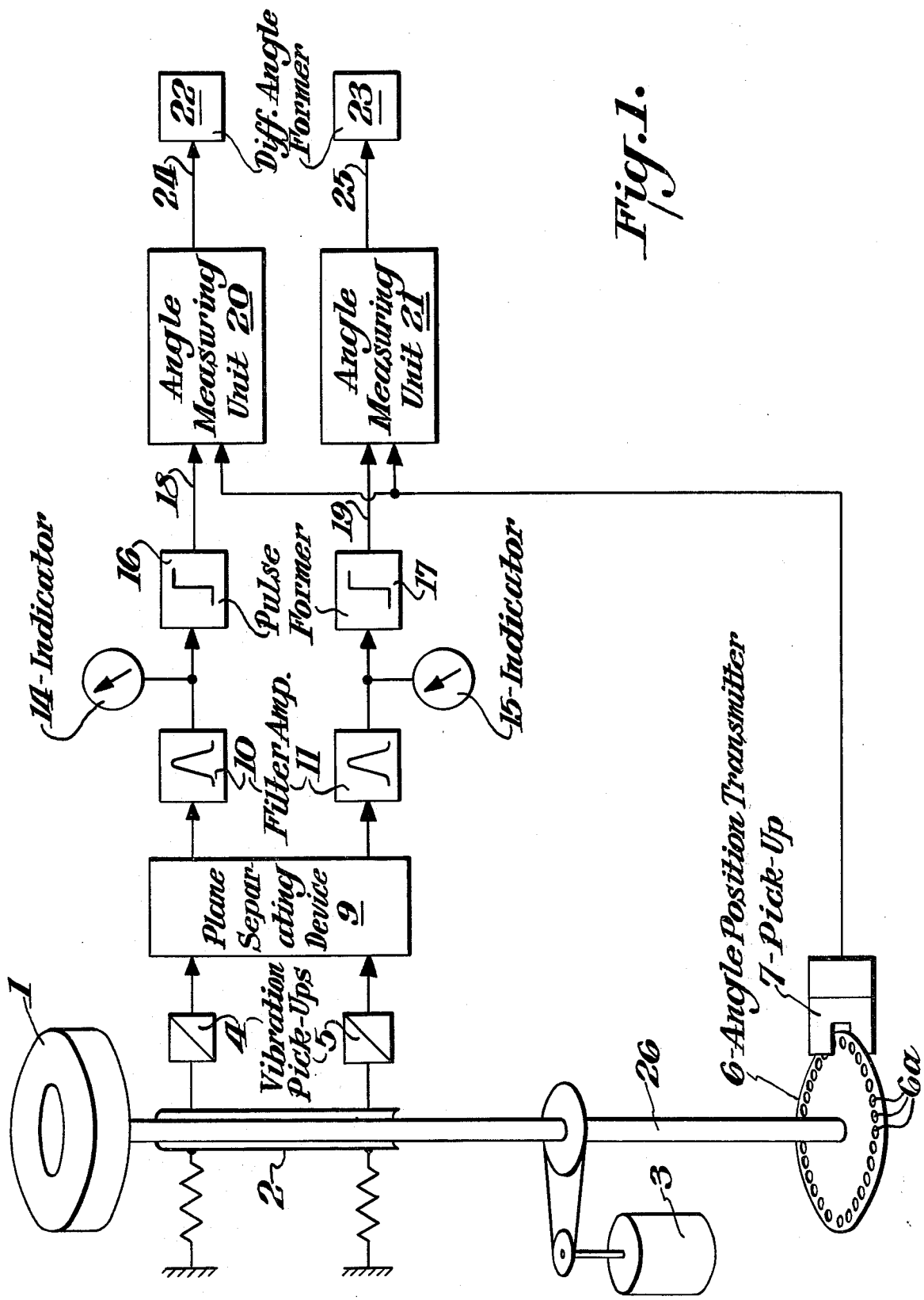
FIG. 1—schematic block diagram of the subject matter of a system which is one embodiment of this invention.

The balancing machine, schematically illustrated in FIG. 1, consists essentially of a shaft 26, driven by means of motor 3, which at its one end supports the part 1 to be balanced, such as an auto wheel, and at its other end is connected with a digital angle transmitter 6. With rotation, the displacements of shaft 26 caused by the imbalance are supplied by means of a vibratable bearing 2 to vibration pick-ups 4 and 5 and there are converted into electrical signals. These signals are supplied to a plane-separating device 9. At the output of the plane-separating device 9, for each plane there appears separately an output signal, which is processed in similar measuring apparatus per plane. By means of filter amplifiers 10 and 11, resp., the imbalance information is freed of disturbing signals due to disturbing vibrations; in indicator apparatus 14 and 15, resp., the amount of imbalance is indicated; and in pulse formers 16 and 17, resp., the sine-shaped imbalance voltages are converted into square-wave voltages whose zero passages correspond to the angle of the imbalance. By means of electrical conduits 18 and 19, resp., this information is supplied to angle-measuring units 20 and 21, resp., which also have supplied thereto by means of electrical conduit 8 pulses coming from angle position transmitter 6, picked up by means of pick-up 7. During the course of measurement, the imbalance angle is processed and digitally stored in the angle measuring units 20 and 21, resp., so that upon a completed course of measurement for turning-in the pulses coming from angle position transmitter 6 may be compared with the values stored in the angle-measuring units 20 and 21, resp., and the comparison result is supplied by means of electrical conduits 24 and 25, resp., to a difference angle indicator 22 and 23, resp., for the control of the light signals arranged in the indicator unit.

Figure 2:
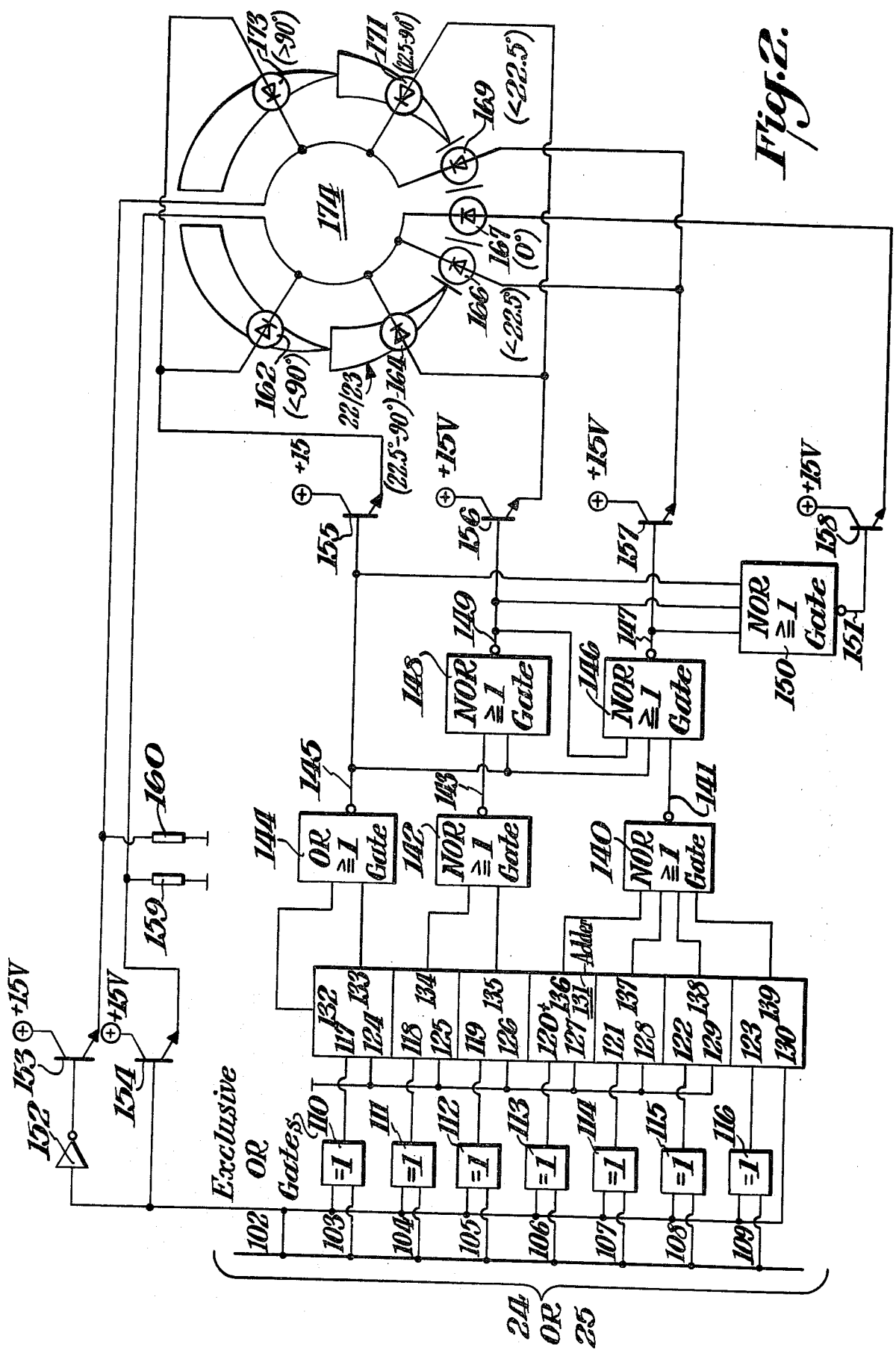
FIG. 2—a preferred control system for the light signals of the system shown in FIG. 1 and its arrangement on an indicating apparatus, and FIG. 3—a perspective representation of a device wherein multiplane balancing may be carried out in conjunction with the system shown in FIGS. 1 and 2.

Illustrated in FIG. 2 is a preferred embodiment of difference angle indicators 22 and 23, resp., with the representation of the light signals arranged thereon.

The difference angle indicators 22 and 23, resp., consist of seven light signals 162, 164, 166, 167, 169, 171 and 173, arranged on a diagram 174, which indicate the distance from a difference angle 0. Light signal 167 lights up if the differential angle is 0, more precise lies between 1.4° and 0°. The light transmitters are divided into two groups per rotational direction, and in particular 162, 164, 166 for turning-in coming from the left and light transmitters 173, 171 and 169 for the turning-in direction coming from the right. As shown in FIG. 2, arrow-shaped symbols are applied to the diagram indicating the shortest direction to the processing location. Light signal 162 or 173 is turned on if more than 90° remains to be turned. Light signals 164 and 171, resp., was turned on if no more than 22.5° are left to be turned. Light signals 166 and 169, resp., are turned on if less than 22.5° remain to be turned but not yet the difference angle zero, i.e., the processing location has been reached. Other angle limits may also be selected for the lighting up of the light signals.

For the representation of the difference angle, the so-called two-complement coding with 8 bit is selected, so that electrical conduits 24 and 25, resp., illustrated in FIG. 1, for each plane correspond to electrical conduits 102, 103, 104, 105, 106, 107, 108, 109, each. Output 102 represents here the sign of the angular difference; outputs 103, 104, 105, 106, 107, 108, 109 have binary, stepped values of 90, 45, 22.5, 11.25, 5.6, 2.8 and 1.4°. In this representation, the angle zero is characterized by level L (0 volts) at all inputs, the quantitative smallest negative angle by the level H (positive supply voltage) at all inputs, and the angle minus 180° by H at the input 102 and L at the outputs 103, 104, 105, 106, 107, 108, 109.

With a positive sign, a transistor 153 is switched conductive via an inverter 152, said transistor raises the common cathode of the light emitting diodes 169, 171, 173 to a positive supply voltage and a flow of current through this light diode group is prevented thereby. With a negative sign, a transistor 154 is switched conductive which raises the common cathode of the light diodes 162, 164, 166 and 167 to the positive supply voltage and thus prevents a flow of current through this light diode group.

From the angular difference at inputs 103, 104, 105, 106, 107, 108, and 109, controlled by the sign at input 102, there is first formed the absolute value by means of exclusive OR gates 110, 111, 112, 113, 114, 115, 116 and an addition performed in adder 131. With a positive sign, the input voltage 103 through 109 pass unchanged through the exclusive OR gates 110 through 116 and, furthermore, appear unchanged at the particular outputs 133, 134, 135, 136, 137, 138, 139 of adder 131 (addition of zero). While with a negative sign, the input voltages 103 through 109 are inverted in the exclusive OR gates 110 through 116 and one unit of the least significant bit is added in adder 131 for the result.

If the absolute value of the angular difference is greater than 90°, there appears at output 133 of adder 131 the H signal; with a 180° difference, the H signal appears at the carry output 132. In both instances, a transistor 155 is switched conductive via the OR gate 144. The anodes of light diodes 162 and 173 are switched thereby to a positive supply voltage. With a positive difference angle signal, the current flows by way of light diode 162 and resistor 159, and with a negative sign, by way of light diode 173 and resistor 160, so that the angular difference is indicated as being greater than 90° and with the correct direction. A further light diode is not controlled, since transistors 156, 157, and 158 are cut off by NOR gates 148, 146, and 150 due to the H signal at the output 145 of OR gate 144.

If the difference angle is in the range between 22.5° and 90°, the H signal appears at one of the outputs 134, 135 of adder 131. In both instances, transistor 156 is switched conductive via the NOR gates 142 and 148, while transistors 157 and 158 are cut off by means of NOR gates 146 and 150. Since neither at output 132 nor at 133 does there appear the H signal, transistor 155 is also cut off. By means of transistor 156, the anodes of the light diodes 164 and 171 are switched to the positive supply voltage. With a positive sign, the current flows by way of light diode 164 and resistor 159, and with a negative sign, it flows by way of light diode 171 and resistor 160, so that the angular difference between 22.5° and 90° becomes indicated.

If the difference angle is less than 22.5°, but not zero, the H signal appears at one of the outputs 136 through 139 of adder 131. Via NOR gates 140 and 146, transistor 157 is switched conductive and thus the anodes of light diodes 166 and 169 are connected to the positive voltage. Depending on the sign, light diode 166 or 169, therefore, indicates the occurrence of an angle as being less than 22.5°, and via NOR-gate 150 transistor 158 is cut-off. Since at none of the outputs 132 through 135 does there appear a H signal, transistors 155 and 156 are also not controlled.

Only if at angular difference zero none of the transistors 155 through 157 is turned on (all outputs 132-139 on L signal), transistor 158 is turned on via NOR gate 150 and thus light diode 167 is connected to the positive voltage. By way of resistor 159, current therefore, flows and thus the exact turning-in condition is indicated.

The preferred device illustrated in FIG. 2 represents the simplest embodiment, and it is feasible without difficulty that with a greater number of light diodes, a finer division of the angular ranges may be achieved, that other limits of the angular ranges may be selected or that beginning with the first, the further diodes are also switched on with the lighting thereof. In place of the control circuit illustrated, other control circuits are also feasible; particularly when another coding is selected.

In FIG. 3, as an example of an arrangement for balancing in two planes, there is shown the perspective illustration of a motor vehicle wheel, whereby at the upper side and the bottom side there are arranged light diodes 162, 164, 166, 167, 169, 171, 173 for the upper plane and 162', 164', 166', 167', 169', 171', and 173', for the bottom plane. The arrangement of light signals may correspond to that described in conjunction with diagram 174 in FIG. 2.

The elements represented by the following reference numerals may, for example, be provided by the indicated components manufactured and sold by suppliers as indicated and identified by the accompanying part number:

| Reference Numeral | Part No. & Supplier | |
|---|---|---|
| 110–116 | CD 4030 AE | |
| 131 | CD 4008 AE | |
| 142, 148 | CD 4001 AE | |
| 146, 150 | CD 4025 AE | RCA, Somerville, N.J. |
| 140 | CD 4002 AE | |
| 144 | CD 4071 BE | |
| 152 | CD 4049 BE | |
| 153–158 | CA 3082 | |
| 162, 164, 166 167, 169, 171 173 | MV 5054 | Monsanto, Palo Alto California |
| 159, 160 | 470Ω | |

We claim:

1. A process for the turning-in of a part to be balanced affected by imbalance, particularly a motor vehicle wheel, in a balancing machine having a shaft, storing angular information, having light signals relating to the balancing position, which is adjusted into a balancing position by a comparison of the particular angular positions of the shaft with the stored angular information and light signals relating to the balancing position as an indication for the resulting adjustment, comprising the steps of illuminating the light signals to indicate the direction to turn the part toward the balancing position from a momentary out-of-balance position, and illuminating in sequence several light signals signifying progressively shorter intervals as the balancing position is approached whereby the balancing position may be gradually approached without overshooting.

2. A process of claim 1, characterized in that for both possible turning-in directions, a series each of inertialess light signals light up.

3. A process as set forth in claim 1, wherein the angular difference between the momentary out-of-balance positions and the balancing position is indicated in difference ranges by different light signals, one light signal being provided for the range of between 180° to 90° from the balancing position, another light signal being provided for the range of 90° to 22.5°, as additional light signal being provided for the range of between 22.5° and 1.4° and a further light signal being provided upon approaching the balancing position in a range between about 1.4° to 0° from the balancing position.

4. A device for the carrying out a balancing process on a balancing machine with vibration pick-ups, angle position transmitter, angular information storage and a comparison unit whereby in the comparison unit, the momentary position of the angular position transmitter is compared with the stored angle information, and an indicating apparatus is provided, comprising light signals arranged at predetermined points on the indicating apparatus, the comparison unit being connected to the indicating apparatus and having a series of comparison phases on both sides of the balancing position, and the magnitude of the phase decreasing as the balancing position is approached whereby the direction and mangitude of angular difference between momentary positions and the balancing position are indicated so that the balancing position may be obtained without overshooting.

5. A device as set forth in claim 4 characterized in that there are provided per turning-in direction, a light signal for the range of between 180° and 90°, a further light signal for the range of between 90° and 22.5°, a further light signal for the range of between 22.5° and 1.4°, and that upon reaching the balancing position, an additional light signal lights up, and in particular between 0° and 1.4°.

6. A device according to claim 5 for the multiplane balancing, characterized in that a figure representing the part to be balanced carries a series of light signals per turning-in direction, for each balancing plane.

7. A device according to claim 6, characterized in that the light signals are arranged geometrically in the center of the correlated range of the difference angle.

* * * * *